Feb. 6, 1923.   
J. J. BUKOLT  
CHILD'S VEHICLE  
Filed Sept. 1, 1921
1,444,656
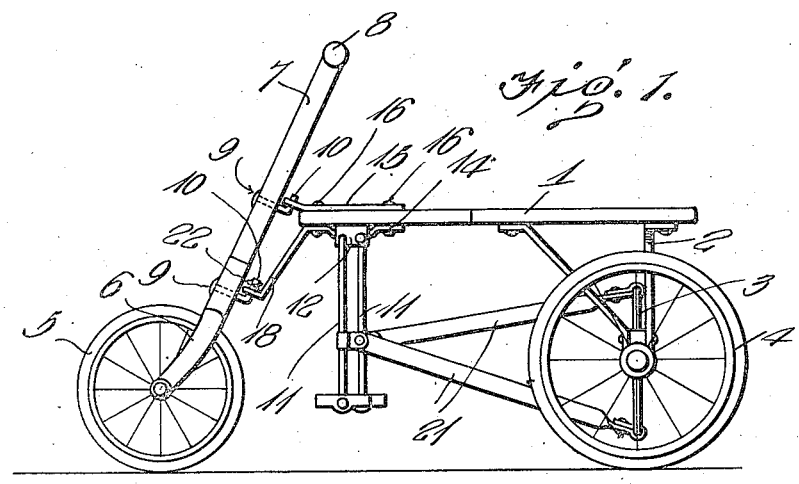
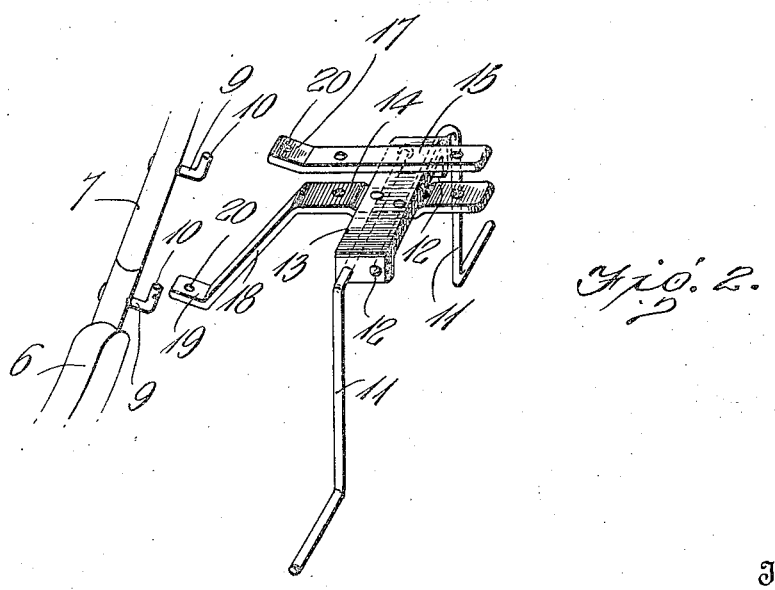
Witness  
J. R. Pierce
Inventor  
John J. Bukolt  
By H. B. Wilson & Co.  
Attorneys Patented Feb. 6, 1923.

1,444,656

UNITED STATES PATENT OFFICE.

JOHN J. BUKOLT, OF STEVENS POINT, WISCONSIN.

CHILD'S VEHICLE.

Application filed September 1, 1921. Serial No. 497,622.

*To all whom it may concern:*

Be it known that I, JOHN J. BUKOLT, a citizen of the United States, residing at Stevens Point, in the county of Portage and State of Wisconsin, have invented certain new and useful Improvements in a Child's Vehicle; and I do declare the following to be a full, clear, and exact description of the invention, such as will enable others skilled in the art to which it appertains to make and use the same.

This invention relates to an improved child's vehicle and one object of the invention is to provide a vehicle having improved means for pivotally connecting the post of the front wheel carrying fork with the forward end portion of the platform or seat-board of the vehicle.

Another object of the invention is to provide improved bearing strips carried by the seat-board or platform, the strips being so formed that the front wheel carrying fork will be positioned to extend at an incline and thus the vehicle permitted to be easily guided.

Another object of the invention is to so construct the bearing strips that they may serve as securing means for a bar which extends transversely beneath the platform or seat-board and serves as means for mounting the pedals.

Another object of the invention is to provide a vehicle of the character described in which the means for mounting the pedals and front wheel carrying fork will be of a simple construction, cheap to produce and easy to assemble.

This invention is illustrated in the accompanying drawings, wherein:

Figure 1 is a view showing the child's vehicle in side elevation.

Figure 2 is a perspective view of the improved bearing structure.

This vehicle is provided with a body portion including a platform or seat-board 1 which is supported at its rear by means of brackets 2 which serve to rotatably mount the crank shaft 3 upon which will be mounted the rear supporting wheels 4. The front wheel 5 is mounted in the forks 6 which are provided with a post 7 terminating at its upper end in a handle bar 8. It is obvious that if desired, a steering wheel may be provided instead of the handle bar 8. Pivot pins 9 are passed through the post and have their end portions bent to provide upstanding end portions or fingers 10. The vehicle is to be propelled by means of pedals 11 which have their upper end portions journaled in the depending end portions 12 of the bar or block 13. This bearing bar 13 is riveted to a strip 14 which extends longitudinally beneath the forward end portion of the platform 1. A shorter strip 15 extends longitudinally of the platform upon the upper face thereof and securing rivets 16 are provided to securely hold the strips in place with the forward end portions thereof extending beyond the forward end of the platform. These strips 14 and 15 form bearing brackets, the forward end portion 17 of the strip 15 being bent upwardly as shown and the strip having its forward portion 18 bent downwardly at a forward incline and then bent to provide an end extension 19 which extends parallel to the bent end portion 17 of the strip 15. These end portions 17 and 19 extend parallel to the pivot pins 9 as shown in Fig. 1 and are provided with openings to receive the upturned end portions 10 of these pins. It will thus be seen that the upturned end portions of these pins may be mounted in the openings 20 and the forks carrying the front wheel will be pivotally connected with the forward end portion of the platform or seat-board 1.

When this vehicle is in use, the child occupies the platform 1 and operates the pedals 11 so that rotary movement will be transmitted to the crank shaft 3 by means of the pitman bars 21. By grasping the steering bar 8, the vehicle can be readily guided. It should be noted that since the post 7 extends at a rearward incline as shown, a turn can be readily made. It will be further noted that the vehicle is so constructed that the weight upon the platform will serve to prevent any tendency for the bearing brackets or strips to move out of engagement with the upturned end portions of the pins 9. A securing key 22 has been passed through an opening formed in the upturned end portion of the lower pin to prevent the forks from becoming detached from the body portion of the vehicle in case the vehicle is lifted off of the ground. It will thus be seen that there has been provided a very efficient means for mounting the front wheel carrying forks.

I claim:

1. A child's vehicle, a body portion including a seat board, a bearing block, pedals journaled in the bearing block, strips secured to the upper and lower faces of said seat board and extending longitudinally thereof, the lower strip extending transversely beneath and secured to the bearing block, said strips being extended beyond the forward end of said seat board, and a wheel-carrying fork having a post provided with pivot elements journaled in the forward end portions of said strips.

2. In a child's vehicle, a body portion including a seat-board, a bearing block, pedals journaled in the bearing block, a strip upon the upper surface of the forward end portion of said platform extending beyond the forward end thereof, a strip secured to the underface of said bearing block and engaging the underface of the forward end portion of said platform, fasteners passing through said strips and through said platform to secure the strips to the platform with the lower strip supporting said bearing block, the forward portion of the lower strip being bent downwardly, at a forward incline and having its end portion bent to extend forwardly beneath the extended forward end portion of the upper strip, a wheel-carrying fork having a post extending upwardly, and pivot elements carried by said post and journaled in the end portions of said strips.

3. A child's vehicle comprising a platform, steering means and propelling means including a wheel-carrying shaft rotatably mounted beneath the rear portion of the platform, strips secured to the upper and lower faces of said platform and extended beyond the forward end thereof to pivotally mount the steering means, a cross bar extending across the lower one of said strips and secured to and supported by the said strip and having its end portions provided with depending flanges, pedal bars having upper shaft portions journaled in the depending flanges and extending beneath the cross bar and lower strip, and pitman bars pivotally connected with the wheel-carrying shaft and pedal bars.

In testimony whereof I have hereunto set my hand.

JOHN J. BUKOLT.